United States Patent
Wang et al.

(10) Patent No.: US 7,355,714 B2
(45) Date of Patent: Apr. 8, 2008

(54) RECONFIGURABLE MEMS FABRY-PEROT TUNABLE MATRIX FILTER SYSTEMS AND METHODS

(75) Inventors: Yao Rong Wang, Webster, NY (US); Peter M Gulvin, Webster, NY (US); Lalit K Mestha, Fairport, NY (US); Pinyen Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 11/319,389

(22) Filed: Dec. 29, 2005

(65) Prior Publication Data

US 2007/0153288 A1 Jul. 5, 2007

(51) Int. Cl.
*G01B 9/02* (2006.01)
*G01J 3/45* (2006.01)
(52) U.S. Cl. ........................ 356/454; 356/450
(58) Field of Classification Search ............ 356/450, 356/454, 458, 451, 519
See application file for complete search history.

(56) References Cited

U.S. PATENT DOCUMENTS

| | | | | |
|---|---|---|---|---|
| 5,142,414 | A * | 8/1992 | Koehler | 359/578 |
| 5,550,373 | A * | 8/1996 | Cole et al. | 250/338.1 |
| 5,818,586 | A * | 10/1998 | Lehto et al. | 356/454 |
| 6,295,130 | B1 | 9/2001 | Sun et al. | |
| 6,525,815 | B2 * | 2/2003 | Kung et al. | 356/328 |
| 6,683,691 | B2 * | 1/2004 | Grunwald et al. | 356/450 |
| 6,714,337 | B1 * | 3/2004 | Amm | 359/290 |
| 6,785,001 | B2 * | 8/2004 | Almarzouk et al. | 356/450 |
| 6,801,354 | B1 * | 10/2004 | Payne et al. | 359/291 |
| 6,829,092 | B2 * | 12/2004 | Amm et al. | 359/573 |
| 6,985,233 | B2 * | 1/2006 | Tuschel et al. | 356/454 |
| 2006/0132787 | A1 * | 6/2006 | Mestha et al. | 356/454 |
| 2007/0153287 | A1 * | 7/2007 | Lin et al. | 356/454 |

OTHER PUBLICATIONS

U.S. Appl. No. 11/016,952, filed Dec. 20, 2004, Mestha et al.
U.S. Appl. No. 11/092,635, filed Mar. 30, 2005, Mestha et al.
U.S. Appl. No. 11/092,835, filed Mar. 30, 2005, Wang et al.

* cited by examiner

*Primary Examiner*—Patrick Connolly
*Assistant Examiner*—Scott M Richey
(74) *Attorney, Agent, or Firm*—Oliff & Berridge, PLC

(57) ABSTRACT

An optical apparatus may include a plurality of Fabry-Perot cavities and a controller. The plurality of Fabry-Perot cavities receives an incoming image. The controller controls a group of adjacent Fabry-Perot cavities of the plurality of Fabry-Perot cavities to sample spectral information from a pixel of the incoming image. The group maybe designated to the pixel. Sizes of the cavities within the group may differ from one another. The sizes of the cavities within the group may be fixed during the spectral information synthesis operation.

22 Claims, 9 Drawing Sheets

RECONFIGURABLE MEMS FABRY-PEROT TUNABLE MATRIX FILTER SYSTEMS AND METHODS

Cross-reference is made to co-pending, commonly assigned application, U.S. application Ser. No. 11/092,635, filed Mar. 30, 2005, by Mestha et al., entitled "Two-Dimensional Spectral Cameras And Methods For Capturing Spectral Information Using Two-Dimensional Spectral Cameras," U.S. Pat. No. 6,295,130 issued Sep. 25, 2001, U.S. application Ser. No. 11/016,952, filed Dec. 20, 2004, by Mestha et al, entitled "Full Width Array Mechanically Tunable Spectrophotometer," and U.S. application Ser. No. 11/092,835, filed Mar. 30, 2005, by Wang et al., entitled "Distributed Bragg Reflector Systems and Methods," the entire disclosures of which are herein incorporated by reference.

BACKGROUND

U.S. Pat. No. 6,295,130 discloses a microelectromechanically tunable Fabry-Perot spectrophotometer provided for color sensing. Optical fiber provides light input to a Fabry-Perot filter which is adjusted by a switched capacitor circuit. Spectral intensity is sensed by an integrated photodetector.

Also, digital cameras are one of many potential new applications of Fabry-Perot devices. Current RGB based digital cameras is a fast-growing segment of the digital consumer market, and are used largely for producing photographic images. Each pixel of a subject is captured digitally in terms of RGB (red, green and blue) separations.

Digital cameras typically use charged-couple-device (CCD) or complementary metal-oxide semiconductor (CMOS) chips as image sensors. Such CCD or CMOS chips record light from a subject when capturing an image of the subject.

SUMMARY

The above-discussed digital cameras are mainly point-and-shoot cameras which give relatively low-resolution color images. RGB data obtained from such low-resolution cameras give significant color distortions. Thus, such low-resolution digital cameras are not suitable for certain applications, such as non-invasive diagnosis, for example, for diagnosing and monitoring infections, accurate human identifications from color images, provision of human-like computer vision to robots, remote sensing or the like.

Co-pending application Ser. No. 11/092,635 discloses various exemplary systems and methods that provide low cost spectral cameras, such as two-dimensional spectral cameras, that include a plurality of spectrophotometers, for example, in a two-dimensional array, such as a multiple Fabry-Perot cavity filter with silicon photodetectors distributed one beside another in a two-dimensional matrix fashion. Each cavity may be designed to capture a pixel from an image. Such spectral cameras may use, for example, Fabry-Perot type two-dimensional spectral sensors in place of CCD/CMOS RGB chips found in conventional digital cameras. A two-dimensional Fabry-Perot MEMS (micro-electromechanical-system) array may function as an image sensor to capture the image in spectral form. The captured spectral image data may be displayed as a conventional image, or as a plurality of spectral images. The image data may also be output to an external device for display or further processing.

The advantages of the Fabry-Perot architecture disclosed in the co-pending application Ser. No. 11/092,635 include high spatial resolution. However, changing the size of gap cavity during operation requires considerable membrane movement. Thus, the lifetime of the Fabry-Perot MEMS (micro-electromechanical system) array may be compromised. Thus, when it is not required to have high spatial resolution, such a compromise is not desirable, and an improved lifetime of the Fabry-Perot MEMS array is preferable.

Various exemplary embodiments of systems and methods provide a Fabry-Perot system with improved overall lifetime and reliability. The system may include a set of Fabry-Perot cavities arranged side-by-side, the cavities having fixed gaps. The system may include a set of Fabry-Perot cavities each having a pair of membranes with fixed gaps each between a pair of membranes. For example, the sizes of the cavities within a group of pixels may be fixed during a spectral information synthesis operation. In the set of Fabry-Perot cavities, the sizes of the fixed gaps differ from one another so that a spectral range may be assembled from each wavelength band of each of these fixed gaps. The membranes of the fixed gaps do not move during an operation of, for example, measurements, thereby improving the lifetime and reliability of the membranes. Also, if the motion of the membranes is required, then the range of motion can be limited to few as opposed to having single membrane motion to tune for the entire wavelength range. Before, after, and/or between operations, the fixed gaps may be reconfigured in sizes so that the wavelength band of the gaps may be adjusted to cover a different spectral range.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

The basic structure of a Fabry-Perot cavity spectrophotometer is described in detail in U.S. Pat. No. 6,295,130, and co-pending application Ser. No. 11/092,635, which are incorporated herein by reference in their entirety. The basic Fabry-Perot spectrophotometer includes two micro-mirrors separated by a gap. The gap may be an air gap, or may be filled with liquid or other material. The micro-mirrors include multi-layer distributed Bragg reflector (DBR) stacks or highly reflective metallic layers, such as gold. A voltage applied between the two mirrors may be adjusted to change the distance between the two mirrors. The distance between the two mirrors is also referred to as the dimension or size of the gap. The size of the gap may also be called the height of the gap. Only light with certain wavelength may be able to pass the gap due to interference effect of incident light and reflective light.

Figure 1:
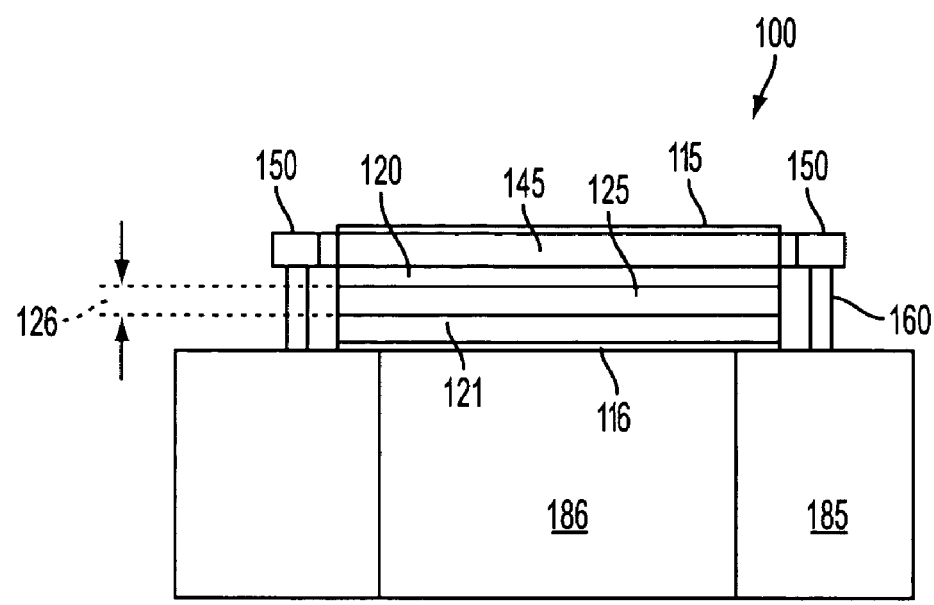
FIG. 1 illustrates a side view of an exemplary Fabry-Perot spectrophotometer.
Figure 2:
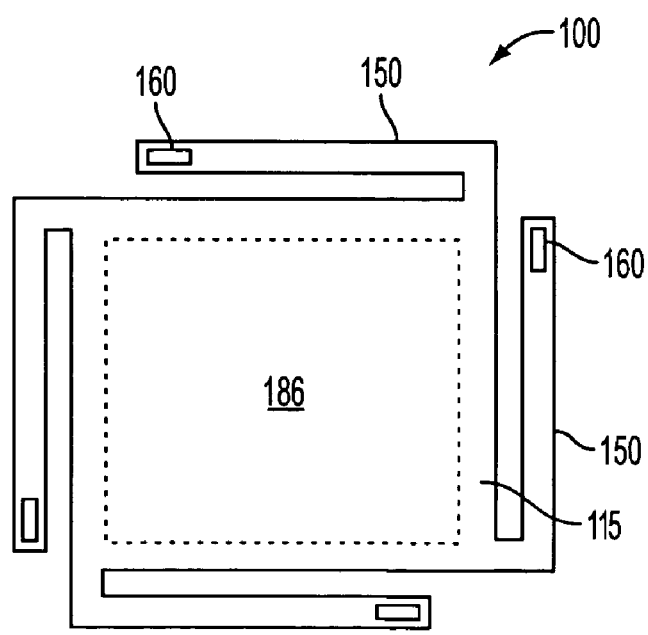
FIG. 2 illustrates a top view of the exemplary Fabry-Perot cavity structure shown in FIG. 1.

For example, FIG. 1 shows a side view of an embodiment of a micro-electro-mechanically tunable spectrophotometer having a Fabry-Perot (F-P) micro-electro-mechanically tunable cavity structure 100. FIG. 2 is a top view of the cavity structure 100. As shown in FIG. 1, the cavity structure 100 may include a top mirror 120 and a bottom mirror 121. In various exemplary embodiments, the bottom mirror 121 may be a bottom distributed Bragg reflector (DBR) mirror that includes three pairs of quarter wavelength $Si/SiN_x$ stacks. The top mirror 120 may be a top distributed Bragg reflector (DBR) mirror that includes two pairs of quarter wavelength $Si/SiN_x$ stacks.

As shown in FIG. 1, the cavity structure 100 may also include a top electrode 115 and a bottom electrode 116. The top electrode 115 may be formed on the top mirror 115 via a support element 145. The bottom electrode 116 may be sandwiched between the bottom mirror 121 and a substrate 185.

The substrate 185 may have a portion 186 that may be a hole or a transparent part. The support element 145 may be a transparent substrate. The top electrode 115 and the bottom electrode 116 may be transparent electrodes. Indium tin oxide (ITO) may be used for the transparent bottom electrode 116 and the transparent top electrode 115.

The top and bottom mirrors 120 and 121 may be separated by a gap cavity 125. The gap cavity 125 may be maintained in a variety of ways. In various exemplary embodiments, the gap cavity 125 may be maintained using a plurality of springs 150. As shown in FIGS. 1 and 2, each of the plurality of springs 150 corresponds to a respective one of a plurality of anchors 160. The plurality of springs 150 are connected to the support element 145 such that the top mirror 120 is kept away from the bottom mirror 121 by the gap cavity 125.

The gap cavity 125 may be characterized by the distance 126 between the top and bottom mirrors 120 and 121. The distance 126 represents a dimension of the gap cavity 125, and may be referred to as a size or height of the gap cavity 125.

The size 126 may be changed or otherwise adjusted. For example, top mirror 120 may be deformed to a dimensional change in the gap cavity 125 by applying a voltage in the range of 5-100 volts across transparent bottom electrode 116 and transparent top electrode 115, or a charge in the range of $10^{-11}$ coulombs on transparent bottom electrode 116 and transparent top electrode 115 to effect a change in the size 126 of gap cavity 125 of about 300 to 500 nm. Hence, electrodes 115 and 116 may form a capacitor and the Fabry-Perot cavity structure 100 may have an associated capacitance. As the size 126 of gap cavity 125 decreases, for example, the Fabry-Perot transmission peak shifts to shorter wavelengths.

The size 126 may be changed in a variety of ways. For example, the size 126 may be changed in a way in which the top mirror 115 stays stationary, while the bottom mirror 116 moves relative to the top mirror 115. Alternatively, the size 126 may be changed in a way in which the bottom mirror 116 stays stationary, while the top mirror 115 moves relative to the bottom mirror 116. Alternatively, the size 126 may be changed in a way in which both the top mirror 115 and the bottom mirror 116 are moving relative to each other. In various exemplary embodiments, the top mirror 115 and the bottom mirror 116 maintain parallel with each other regardless of the relative movement therebetween.

Furthermore, the size of the gap cavity 125 may be changed by a mechanism other than application of a voltage. For example, the size of gap cavity 125 may be changed by a mechanical, thermal or magnetic mechanism.

In the cavity structure 100 shown in FIG. 1, light may be received at the top of the cavity structure 100 through the top electrode 115. The received light may be transmitted through the gap cavity 125 and the portion 186 of the substrate 185 at a tuned wavelength.

Also, a photodetector may be formed on a different chip (not shown) where the cavity structure 100 is formed, so that the light transmitted may be detected, if necessary, by the photodetector formed on the other chip.

Figure 3:
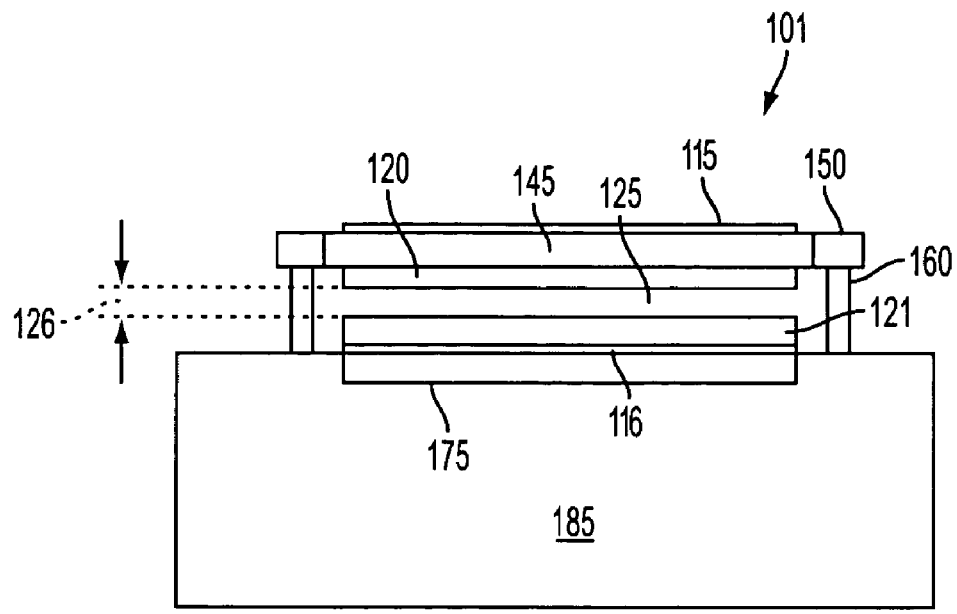
FIG. 3 illustrates a side view of another exemplary Fabry-Perot spectrophotometer.
Figure 4:
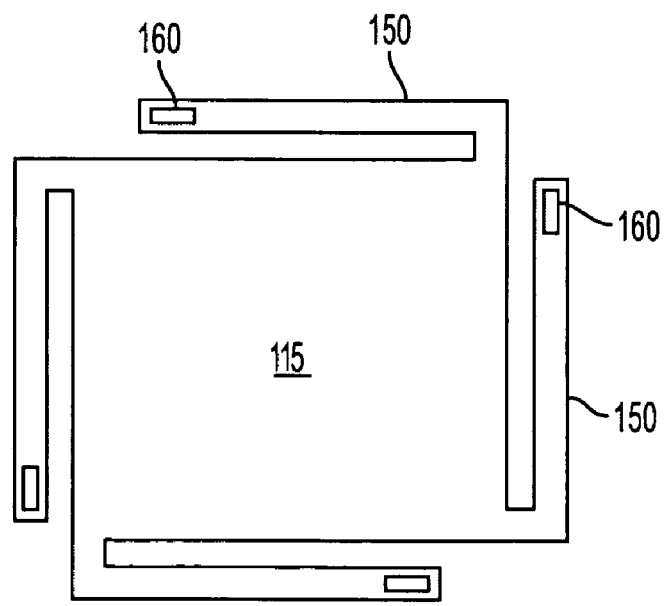
FIG. 4 illustrates a top view of the exemplary Fabry-Perot cavity structure shown in FIG. 3.

FIG. 3 shows a side view of another embodiment of a micro-electro-mechanically tunable spectrophotometer having a Fabry-Perot (F-P) micro-electro-mechanically tunable cavity structure 101. FIG. 4 is a top view of the cavity structure 101. As shown in FIG. 3, a photodetector 175 may be formed on the substrate 185. Thus, light received at electrode 115 and transmitted via gap cavity 125 may be detected by the photodetector 175.

Figure 5:
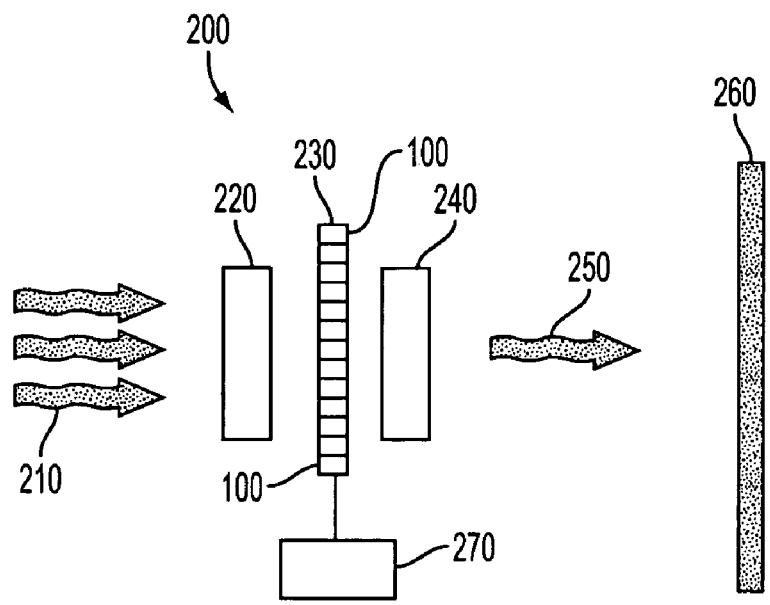
FIG. 5 illustrates a first exemplary Fabry-Perot optical system.

FIG. 5 illustrates a first exemplary Fabry-Perot optical system having a spectral filter array. As shown in FIG. 5, the Fabry-Perot optical system 200 provides a Fabry-Perot tunable filter array 230. Each element of the filter array 230 may be a cavity structure 100 shown in FIG. 1.

The filter array 230 may be located between a first optical lens 220 and a second optical lens 240. The lenses may be selected from a variety of lenses, depending on needs. For example, the first optical lens may be a convex lens, and the second optical lens may be a concave lens. The size of the cavity in each of the cavity structure may be adjusted by, for example, a switching circuit 270, to give a desired transmissive frequency or frequencies. The switching circuit 270 may be a controller that provides the desired frequency or frequencies. The provision of desired frequency or frequencies may be from, for example, a user interface that receives input from a user. The switching circuit 270 may also be a sampling circuit that provides modulation data that contains modulation signals to select the desired cavity gap or gaps. One cavity structure may correspond to one pixel of an incoming image 210. As a result, the incoming image 210 may be filtered to produce a filtered image 250, such as a spectral image produced by filtering the incoming image 210 at a wavelength corresponding to the size of the cavity. The filtered image 250 may be output through an output device. Alternatively, the filtered image 250 may be detected by a detector 260. The detector 260 may be an array of CCD or CMOS sensors.

As discussed above, the size of the cavity of the gap cavity is adjustable. Thus, the filtered image may be generated at any wavelength covered by the spectral space within the adjustable range of the gap cavity. Thus, the filtered image will be generated in various wavelengths by adjusting the size of the gap cavity to transmit selectively very narrow wavelengths or collectively a group of wavelengths of the pixels of the incoming image 210.

The filter array may be a two-dimensional array of thin membranes and may be matrix addressable as a group, or the thin membranes may be addressable independently. In the case of matrix addressable as a group, all membranes in the group are operated by a single element, such as a voltage, while in the case of being addressable independently, each membrane is modulated by its own element, such as a voltage. The membranes may be addressed by actuating voltage signals according to modulation signals. The modulation may be actuated to drive each cavity 100 to achieve desired spectral resolution. When simultaneous actuation is desired, such an actuation may be carried out by actuating the two-dimensional array with the same voltage.

Higher image spatial resolution may be obtained by arranging combinations of a plurality of Fabry-Perot cells on the filtered chip and the plurality of sensors on the detector chip in a grid fashion. A Fabry-Perot cell may include the plurality of gap cavities, each cavity being, for example, a cavity structure 100.

Spectral resolution of the filter array 230 may depend on the mean reflectivity of the mirrors forming the gap cavity 125. The spectral range of a gap cavity may depend on the initial size of the gap cavity and the quarter wavelength Si/SiNx stacks that may be used. For light in the infrared region, the size of gap cavity 125 may be on the order of the infrared wavelength range. When the tuning range of the gap cavity 125 is limited because of, for example, structural limitations, a system consisting of more than one membrane with different initial size of gap cavity and different quarter wavelength stacks may be used to cover a broader spectral range. Such a system may be designed to cover a spectrum range from ultra-violet (UV) to infrared (IR). A detailed description of such a system is provided in copending application Ser. No. 11/092,835 filed Mar. 30, 2005, by Wang et al., the entire disclosure of which is herein incorporated by reference.

In FIG. 5, the filter array 230 may be made of an array of small-sized micro Fabry-Perot interferometers. Such a structure may ensure the simultaneous actuation of the Fabry-Perot interferometers. Such a structure may also improve the uniformity among the Fabry-Perot interferometers, because each cavity may be individually adjusted based on calibration data containing calibration signals. The calibration may be conducted by, for example, the switching circuit 270 which may be connected to the filter array 230.

In FIG. 5, the optical lenses 220 and 240 provide collimation of light. For example, the first optical lens 220 collimates light of the incoming image 210 to the filter array 230.

As shown in FIG. 5, the detector 260 is separated from the filter array 230 by the second lens 240. Thus, the filter array 230 may be formed on a chip on which the detector 260 is not formed, i.e., a different chip. With such an arrangement, the detector 260 may be made with high resolution. For example, the size of a CCD may be made much larger than that of the aperture 199, because the CCD may be placed at a distance from the filter array 230. Also, the second optical lens 240 may be located between the filter array 230 and the detector 260, because the detector 260 is separate and at a distance from the filter array 230. The second optical lens 240 may collimate the filtered image 250 from the filter array 230 to the detector 260, such that the light beams reaching the detector 260 are parallel light beams.

With the structure in which the filter array 230 is formed on a chip without the detector 260, the Fabry-Perot optical system 200 may be used without the detector 260, so that it may function as a filter. Alternatively, the Fabry-Perot optical system 200 may also be used in combination with the detector 260, so that the filtered image 250 may be detected by the detector 260. The detected image may be displayed on a display device, such as a liquid crystal display device (not shown).

Figure 6:
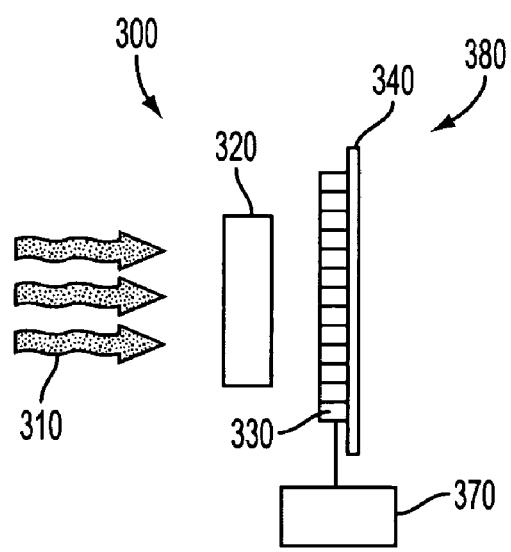
FIG. 6 illustrates a second exemplary Fabry-Perot optical system.

FIG. 6 illustrates a second exemplary Fabry-Perot optical system 300. In FIG. 6, each of the gap cavities is associated with a photodetector 175, as shown in FIG. 3. In particular, a detector 340 is formed on the same chip 380 where the Fabry-Perot array 330 is formed. Each element of the Fabry-Perot array 330 may be a cavity structure 101 shown in FIG. 3. In such a configuration, an incoming image 310 arrives at the Fabry-Perot array 330, where spectral information is obtained and imaged by the Fabry-Perot array 330 and the detector 340, respectively, based on signals from a sampling circuit 370, such as the sampling circuit 270 shown in FIG. 5. An optical lens 320 may be placed in front of the Fabry-Perot array 330 for collimation. However, a second optical lens, such as the second optical lens 240 in FIG. 5, will not be necessary.

In a Fabry-Perot array, such as the Fabry-Perot array 230 in FIG. 5 and the Fabry-Perot array 330 in FIG. 6, a plurality of cavity groups is provided. Each cavity group has a set of fixed gaps and may be used to obtain spectral information of a single pixel in an image, such that the plurality of groups corresponds to a plurality of respective pixels of the image.

Each cavity having a fixed gap is a gap cavity with a fixed size. The size of the fixed gap is not changed during an operation. However, the fixed size of a gap cavity is reconfigurable, for example, before an operation, after an operation or between operations.

Each fixed gap only allows a narrow band of wavelength to transmit (or reflect) light. Within a cavity group, the sizes of fixed gaps differ from one another so that the spectra of the pixel may be assembled from each wavelength band of each of the fixed gaps within the cavity group. In particular, each pixel may contain a group of spectral characteristics, each spectral characteristics being associated with a group of respective wavelengths. Thus, because one pixel corresponds to a group of cavities, each specific cavity in a cavity group may be designated to obtain a spectral characteristic associated with a specific wavelength that corresponds to the cavity size of the specific cavity.

Also, because the cavity array contains a plurality of cavity groups and each cavity group may have one cavity having the specific cavity size, all the cavities having the specific cavity size forms a sub-array of cavities. This sub-array may obtain a spectral image at the specific wavelength corresponding to the specific cavity size.

A cavity group may be arranged in a N×M array, where N and M are integers, so that the group occupies a square or rectangle. Alternatively, the group of cavities may also be arranged in other geometrically shapes, such as a triangle, a diamond, a hexagon, a trapezoid, or a parallelogram.

When the cavity group is arranged in a N×M array, where N and M are integers, N×M equals the number of wavelength bands available for one pixel. For example, to obtain 12 points in the wavelength spectral between 400 mm and 700 mm, the cavity group may have a 4×3, 6×2 or 12×1 single Fabry-Perot design. The gaps may be configured and reconfigured to obtain spectral information of the pixel at a different range and/or resolution of optical spectrum. For example, one range of optical spectrum may be from 400 nm to 700 nm. Another range may be from 380 nm-730 nm.

Figure 7:
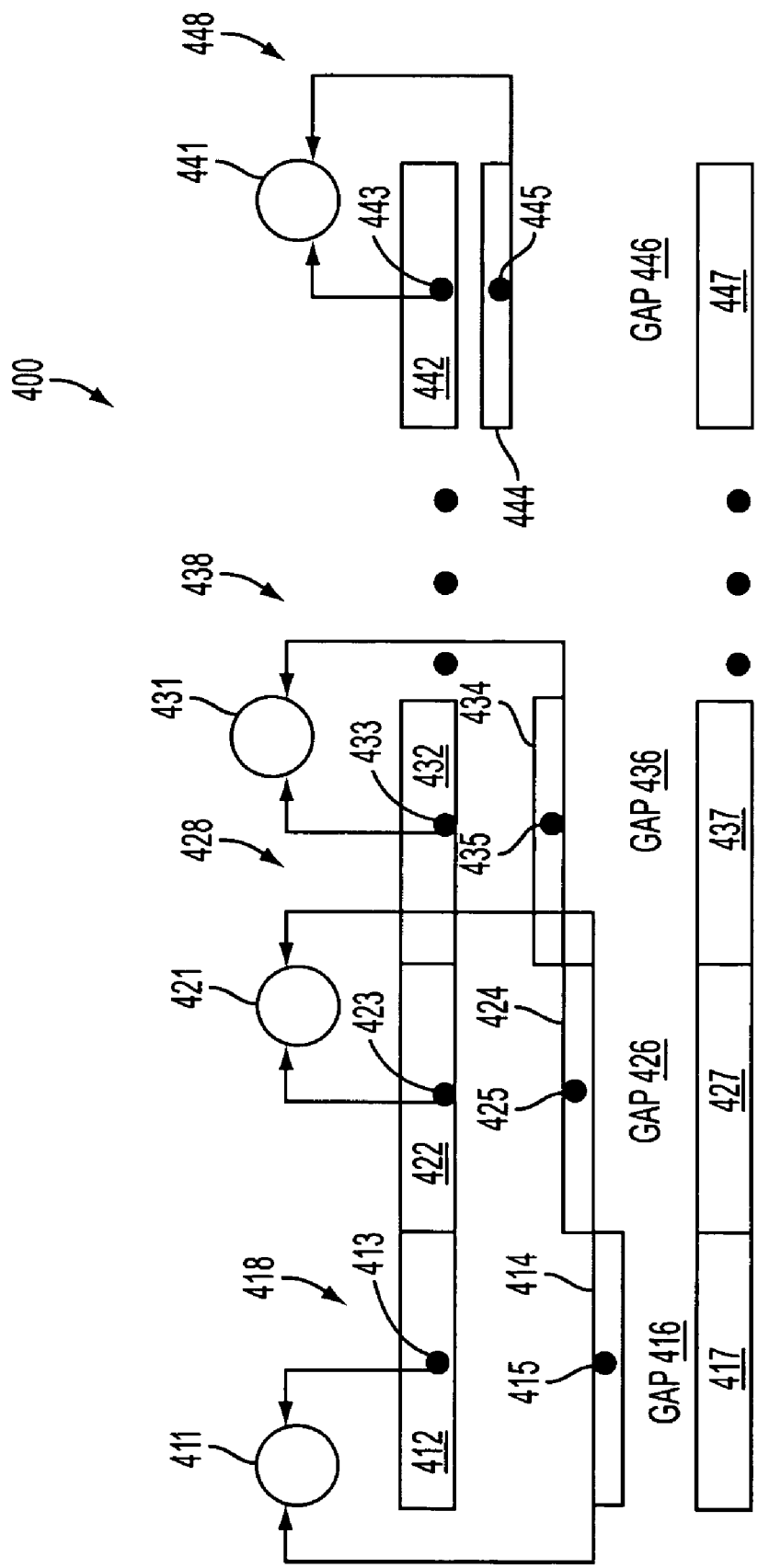
FIG. 7 illustrates a first exemplary gap configuration.

FIG. 7 depicts a cross-section of a fixed-gap cavity group arranged in an N×M array 400. As shown in FIG. 7, this array includes a number of N rows and a number of M columns of individual Fabry-Perot cavities. In FIG. 7, only one column is illustrated with N number of cavities. As shown in FIG. 7, the array 400 includes cavities 418, 428, 438 and 448. Each of the cavities may include a substrate portion, a top mirror, and a bottom mirror. For example, in cavity 418, a voltage 411 may be applied between a contact point 413 of a substrate portion 412 and a contact point 415 of a top mirror 414, so that the distance 416 between the top mirror 414 and a bottom mirror 417 may be adjusted by adjusting the voltage 411. The distances 416, 426, 436 and 446 for cavities 418, 428, 438 and 448, respectively, are different from each other, so the group may cover a spectrum range. The distances are fixed during an operation. The distances may be reconfigured before, after or between operations.

The reconfiguration may be accomplished electrically, mechanically, thermally or magnetically. The reconfiguration may also be achieved by recalibration to accommodate a new set of conditions. For example, this reconfiguration may change the spectral coverage of a fixed gap group from one spectral range to another spectral range.

As discussed above, each image pixel may correspond to a cavity group. Thus, different spectral information may be obtained simultaneously from a pixel, with each cavity in the group of cavities obtaining a unique spectral signal corresponding to the fixed size of the respective cavity. Accordingly, motion of the Fabry-Perot membranes is not needed, thereby improving the reliability and lifetime of the cavities.

Compared to a system in which each cavity corresponds to a pixel, the arrangement shown in FIG. 7 reduces the spatial resolution of a Fabry-Perot array by a factor of the size (number of cavities) of the cavity group. For example, when an N×M group is used to correspond to a pixel, the spatial resolution is reduced by a factor of N×M. On the other hand, because a number of N×M measurements is simultaneously obtained, the speed of measurement is increased by a factor of N×M.

The size of each cavity group may be the same, so that spectral information at each wavelength is obtained by the same number of cavities whose cavity sizes corresponds to the wavelength. However, the size of each cavity group may also be different, depending on different needs of applications.

The reconfigurability may be part of the calibration for each Fabry-Perot cavity. For example, there may be a thickness variation among cavities during the microfabrication process. Typical variation may be less than 2 percent. Nevertheless, 2 percent variation in the size of the gaps could cause significant optical quality degradation. However, in a system shown in FIG. 7, each Fabry-Perot cavity may be fine-tuned to the same gap size for a desired wavelength range with a set of offset initial voltages. The offset initial voltages may be stored in a memory area within the system. The offset initial voltages may be used whenever a calibration process is needed.

Figure 8:
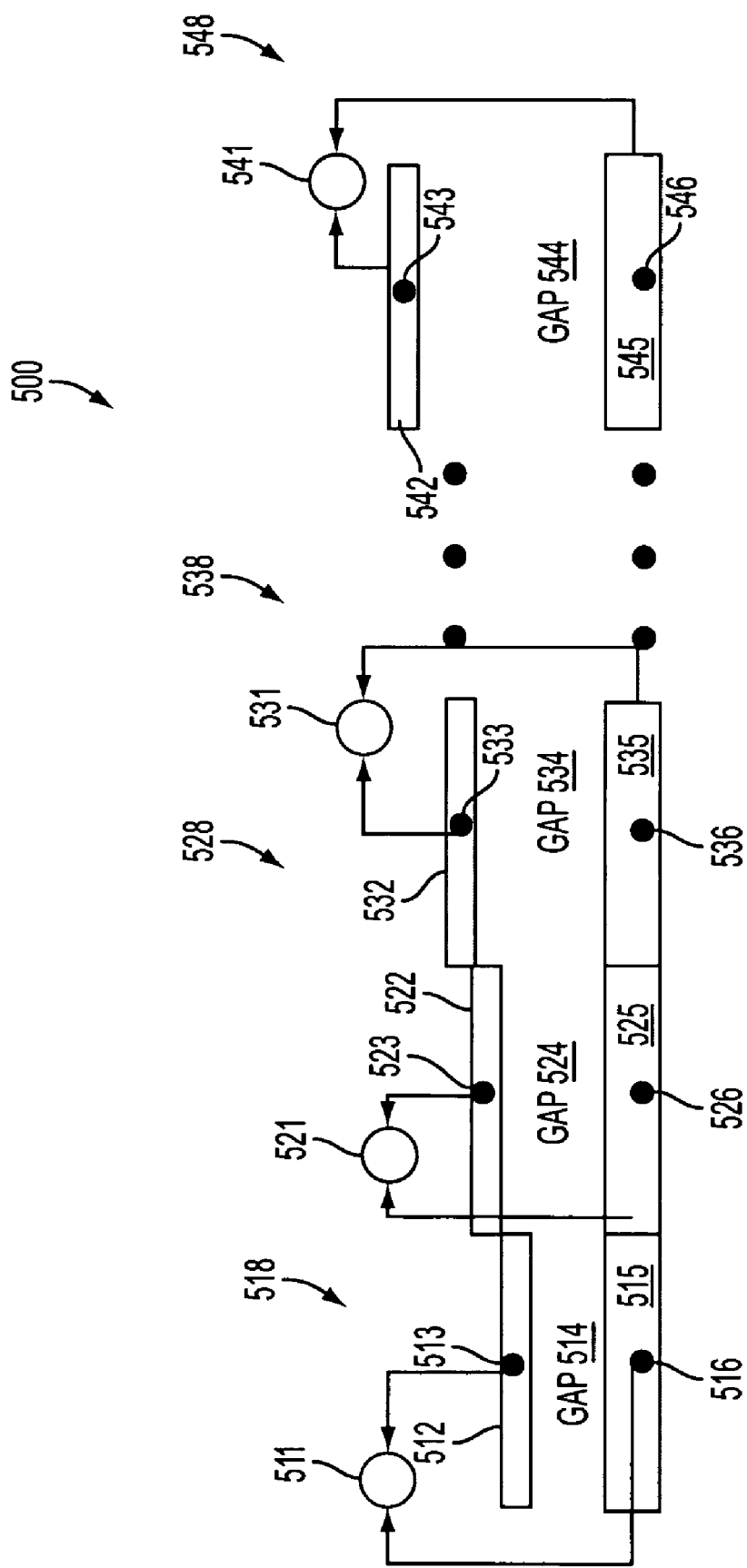
FIG. 8 illustrates a second exemplary gap configuration.

FIG. 8 illustrates a second exemplary configuration 500 of cavities 518, 528, 538 and 548. As shown in FIG. 8, within cavity 518, a voltage 511 may be applied between a contact point 513 of a top mirror 512 and a contact point 516 of a bottom mirror 515, such that the distance 514 between the top mirror 512 and the bottom mirror 515 may be adjusted. For example, as shown in FIG. 8, the top mirror 512 may be the part whose position is adjustable, while the bottom mirror 516 is stationary.

The arrangements shown in FIGS. 7 and 8 may be used to detect spectral information of an incoming signal in various parts of the electromagnetic spectral range. Depending on the mechanical tuning range of the mirrors used to create the gap cavity and the number of such gap cavities, the spectral range resulting from the gap cavity system may range from ultraviolet to near, mid or high infrared wavelengths. Additionally, the wavelength resolutions may be fine-tuned to a narrow range, such as sub-nanometer range, based on fixed sizes of gap cavities. Furthermore, the arrangements in FIGS. 7 and 8 may also be reconfigured to be used as a conventional RGB image, if required, without foregoing the advantages of current technologies associated with conventional RGB images.

Figure 9:
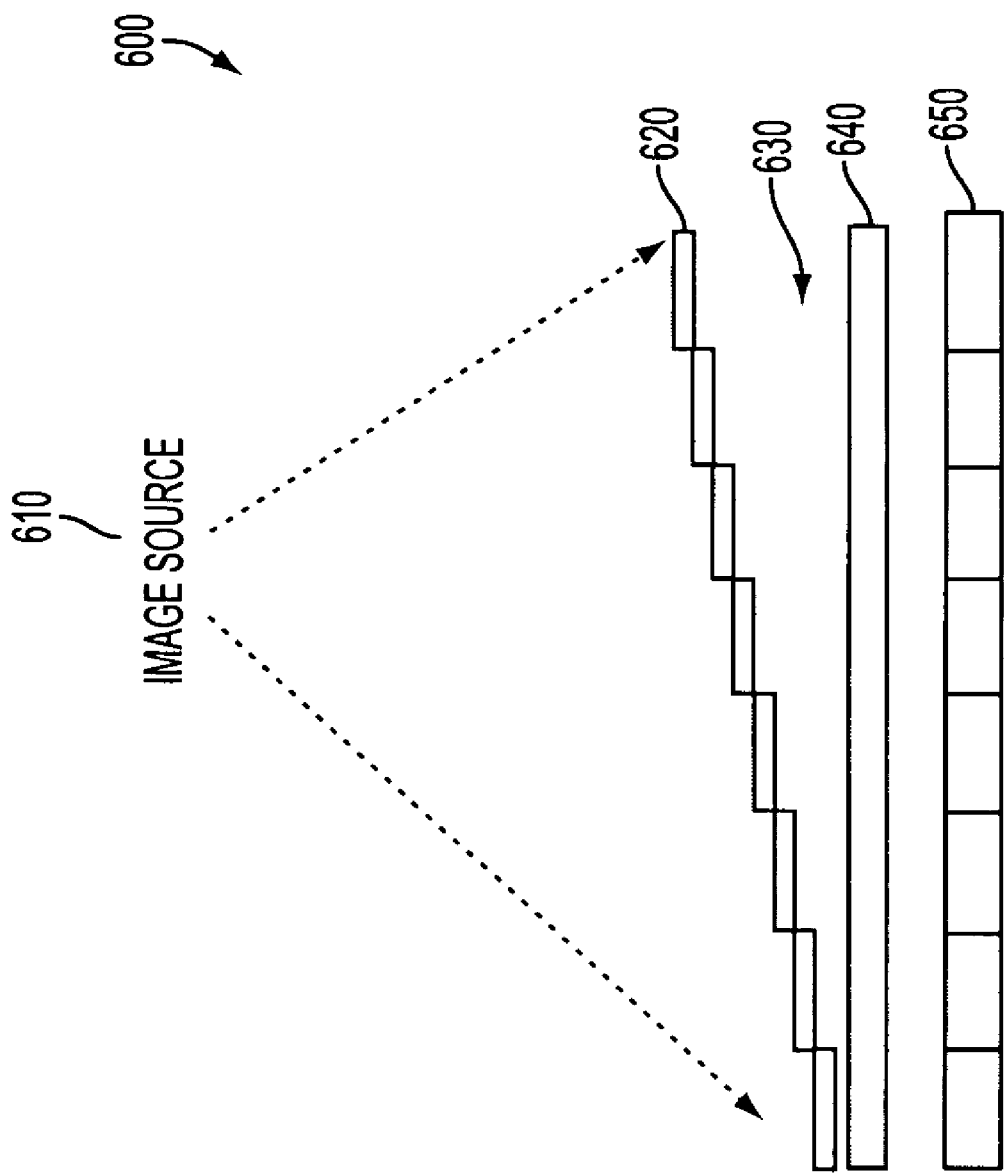
FIG. 9 illustrates a third exemplary gap configuration.

The sizes of the cavity gaps in an N×M two-dimensional matrix may be arranged in an increasing, decreasing or other pre-determined fashion. FIG. 9 illustrates a structure 600 in which an image signal 610 passes through a cavity array to be detected at detector 650. In the cavity array, the size 630 between the top mirror 620 and the bottom mirror 640 increases from the left-hand side to the right-hand side.

Figure 10:
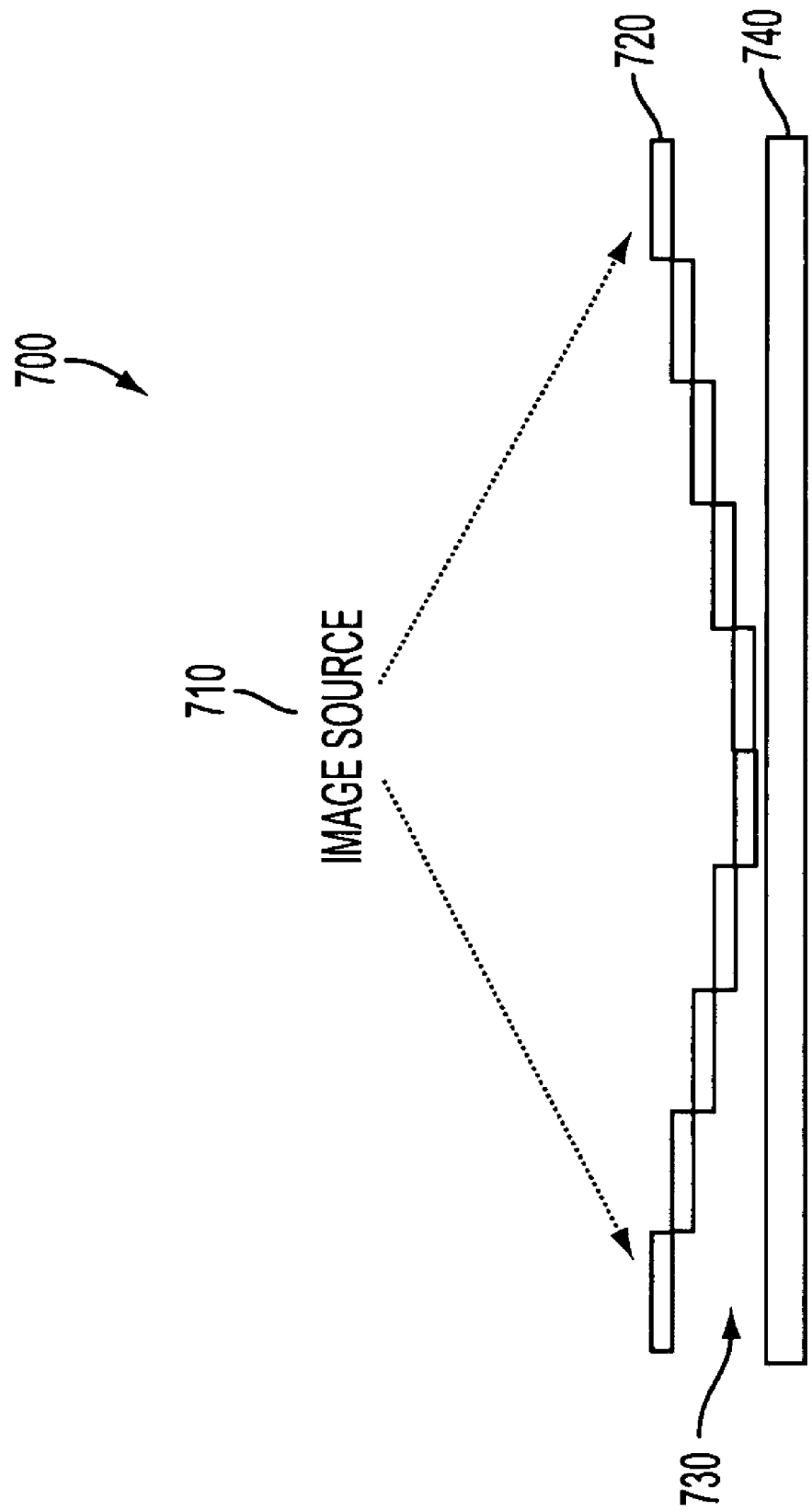
FIG. 10 illustrates a fourth exemplary gap configuration.

FIG. 10 illustrates another configuration 700 of a cavity array used for image signal 710. The size 730 between the top mirrors 720 and the bottom mirrors 740 decreases towards a center of the array of a group of cavities with fixed gaps.

Figure 11:
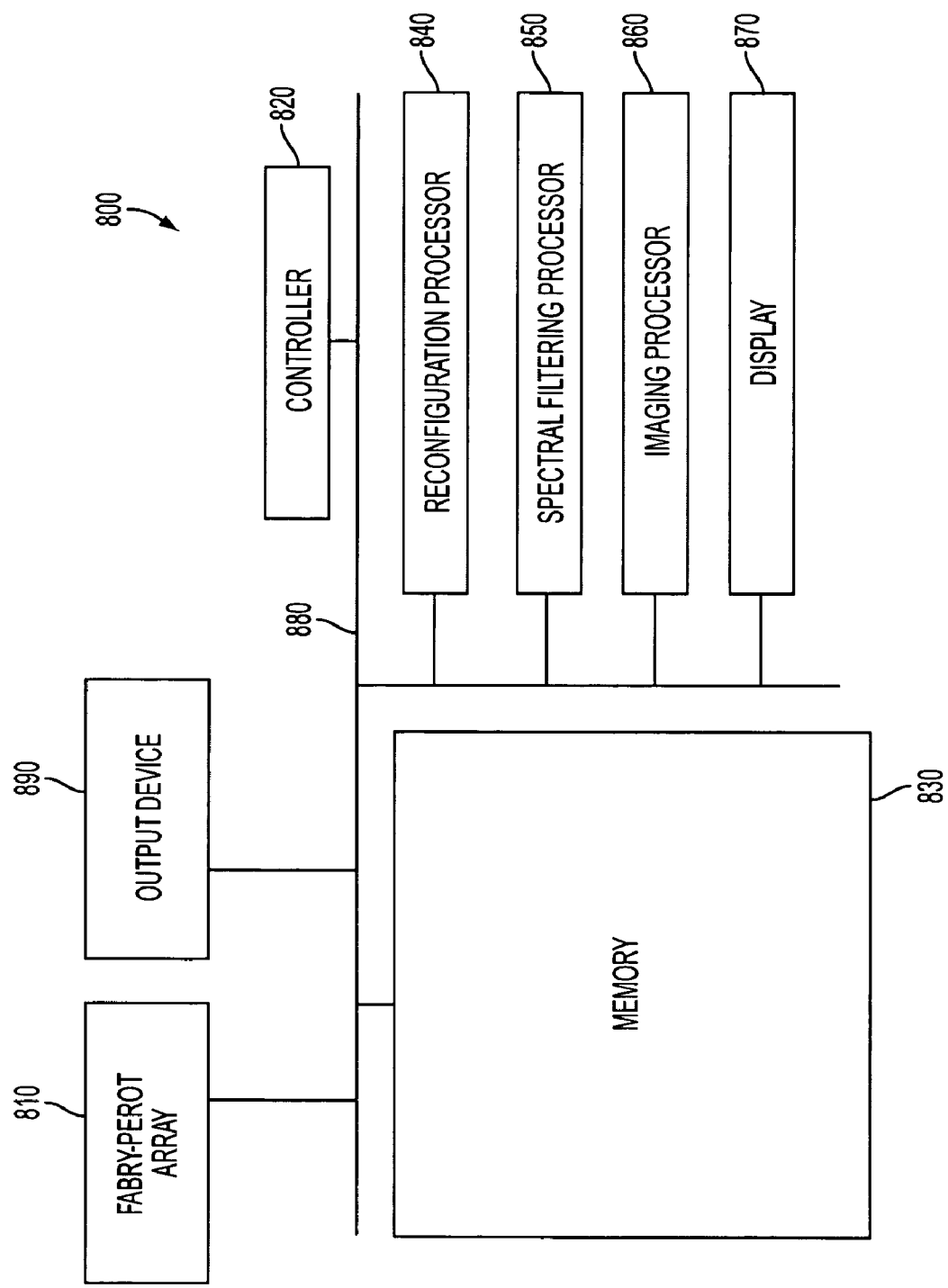
FIG. 11 is a block diagram illustrating an exemplary spectral system.

FIG. 11 illustrates a block diagram of an exemplary spectral system 800. The spectral system 800, as shown in FIG. 11, may include a Fabry-Perot array 810, a controller 820, a memory 830, a reconfiguration processor 840, a spectral filtering processor 850, an imaging processor 860, a display 870, and an output device 890, each connected by a connection or bus 880. The Fabry-Perot array 810 may be a Fabry-Perot array shown in FIGS. 7, 8, 9 or 10.

The various elements in FIG. 11 perform their respective function under control of the controller 820. In operation, the reconfiguration processor 840 may reconfigure the sizes of the gap cavities in the Fabry-Perot array 810, before, after or between operations. During an operation, the Fabry-Perot array 810 receives an incoming image. The spectral filtering processor 850 may obtain spectral information from each pixel of the image. The imaging processor 860 may process detected spectral images, if a detector or an array of detectors is associated with the Fabry-Perot array 810. The display 870 may display processed images, if needed.

The obtained spectral information and/or the detected images may be output through output device 890, and/or may be stored in memory 830.

Figure 12:
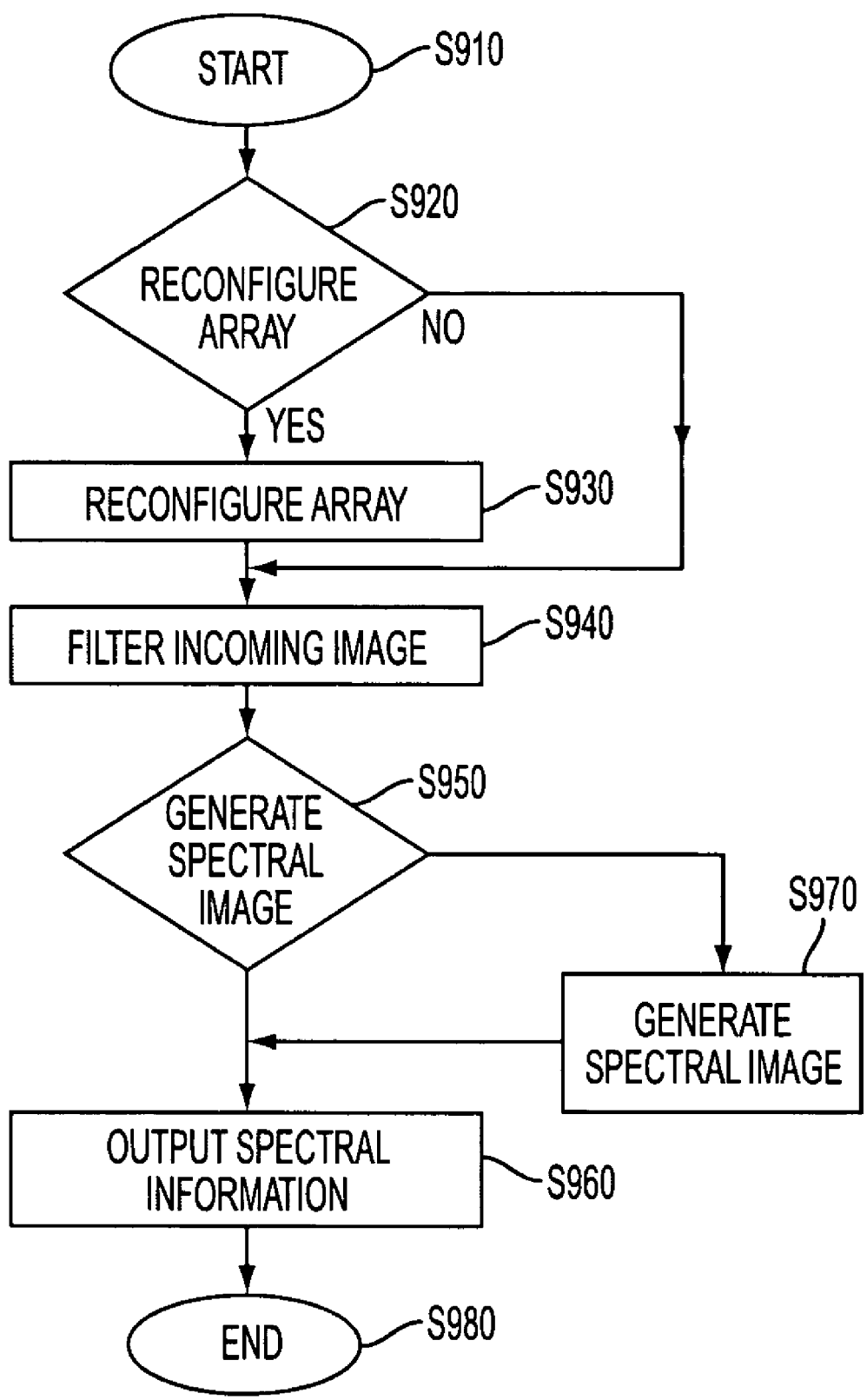
FIG. 12 outlines an exemplary process for using a spectral system.

FIG. 12 outlines an exemplary process for using a reconfigurable Fabry-Perot cavity array. As shown in FIG. 12, starting from step S910, the process proceeds to step S920, where a determination is made whether to reconfigure the cavity array.

If it is determined at step S920 to reconfigure the cavity array, the process continues to step S930, where the cavity array is reconfigured. Thereafter, the process continues to step S940.

On the other hand, if it is determined at step 920 not to reconfigure the cavity array, the process jumps directly to step S940. Then, at step S940, an incoming image is filtered.

Next, at step S950, a determination is made whether to generate spectral images from the filtered images. If it is determined at step S950 to generate spectral signals, the process proceeds to step S970, where spectral images are generated. Thereafter, the process continues to step S960.

On the other hand, if it is determined at step S950 no to generate spectral signals, the process directly jumps to step S960, spectral information, including filtered images and generated spectral images, are output. Thereafter, the process proceeds to step S980, where the process ends. It is understood that one or more of the steps in FIG. 12 may be omitted.

The method illustrated in FIG. 12 may be implemented in a computer program product that may be executed on a computer. The computer program product may be a computer-readable recording medium on which the control program is recorded, or may be a transmittable carrier with in which the control program is embodied as a data signal.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An optical apparatus, comprising:
a plurality of Fabry-Perot cavities; and
a controller that is connected to and controls the Fabry-Perot cavities,
the plurality of Fabry-Perot cavities receives an incoming image;
the controller controls a first group of adjacent Fabry-Perot cavities of the plurality of Fabry-Perot cavities to obtain spectral information from a first pixel of the incoming image, the first group designated to the first pixel, sizes of the cavities within the first group differing from one another, the sizes of the cavities within the first group being fixed during a spectral information synthesis operation, and
the spectral information synthesis operation collects information from a plurality of spectra.

2. The apparatus according to claim 1, wherein the Fabry-Perot cavities are formed on a first chip, the spectral information is output to a detector formed on a second chip, the second chip being different and at a distance from the first chip.

3. The apparatus according to claim 1, wherein the sizes of the cavities in the first group are adjustable before or after the operation.

4. The apparatus according to claim 1, wherein the plurality of Fabry-Perot cavities comprises a plurality of groups of adjacent Fabry-Perot cavities, the first group being one of the plurality of groups, each group being designated to obtain spectral information from a respective pixel of the incoming image.

5. The apparatus according to claim 4, wherein each of the groups comprises an N×M array of Fabry-Perot cavities, where N and M are integers.

6. The apparatus according to claim 4, wherein:
the first group comprises an N1×M1 array of Fabry-Perot cavities, where N1 and M1 are integers, and
a second group comprises an N2×M2 array of Fabry-Perot cavities, where N2 and M2 are integers, N2 and M2 being different from N1 and M1, respectively.

7. The apparatus according to claim 4, wherein the cavities in each of the groups are arranged in a substantially triangle, diamond, hexagon, trapezoid, or parallelogram configuration.

8. The apparatus according to claim 1, wherein the sizes of the cavity gaps in the first group increase monotonically in a direction.

9. The apparatus according to claim 1, wherein the sizes of the cavity gaps in the first group decrease monotonically towards a center part of an area occupied by the first group.

10. The apparatus according to claim 1, wherein the sizes of the cavity gaps are arranged according to a pre-determined fashion.

11. The apparatus according to claim 1, wherein the sizes of the cavities are reconfigurable electrically, mechanically, thermally, or magnetically.

12. A method of filtering an image using an optical apparatus, the optical apparatus comprising a plurality of Fabry-Perot cavities and a controller that is connected to and controls the Fabry-Perot cavities, the method comprising:
receiving an incoming image at the plurality of Fabry-Perot cavities; and
designating a first group of adjacent Fabry-Perot cavities of the plurality of Fabry-Perot cavities to obtain spectral information from a first pixel of the incoming image based on control signals from the controller, sizes of the cavities within the first group differing from one another, the sizes of the cavities within the first group being fixed during a spectral information sampling operation, and
the spectral information synthesis operation collects information from a plurality of spectra.

13. The method of claim 12, wherein the Fabry-Perot cavities and a detector outputting the spectral information are formed on a single chip 14. The method of claim 12, wherein the Fabry-Perot cavities are formed on a first chip, the method further comprising:
outputting the sampled spectral information a detector formed on a second chip, the second chip being different and at a distance from the first chip.

15. The method of claim 12, further comprising:
electrically, mechanically, thermally, or magnetically adjusting the sizes of the cavities in the first group before or after the operation.

16. The method of claim 12, wherein the plurality of Fabry-Perot cavities comprises a plurality of groups of adjacent Fabry-Perot cavities, the first group being one of the plurality of groups, the method further comprising:
designating each group to obtain spectral information from a respective pixel of the incoming image.

17. The method of claim 16, wherein each of the groups comprises an N×M array of Fabry-Perot cavities, where N and M are integers.

18. The method of claim 16, wherein:
the first group comprises an N1×M2 array of Fabry-Perot cavities, where N1 and M1 are integers, and
a second group comprises an N2×M2 array of Fabry-Perot cavities, where N2 and M2 are integers, N2 and M2 being different from N1 and M1, respectively.

19. The method of claim 16, wherein the cavities in each of the groups are arranged in a substantially triangle, diamond, hexagon, trapezoid, or parallelogram configuration.

20. The method of claim 12, wherein the sizes of the cavities in the first group increase monotonically in a direction.

21. The method of claim 12, wherein the sizes of the cavities in the first group decrease monotonically towards a center part of an area occupied by the first group.

22. A computer readable medium storing a program that when executed by a computer is operable to perform the method recited in claim 12.

* * * * *